March 26, 1940.  E. R. KOPPEL  2,194,798
UNIVERSAL JOINT
Filed Nov. 9, 1936
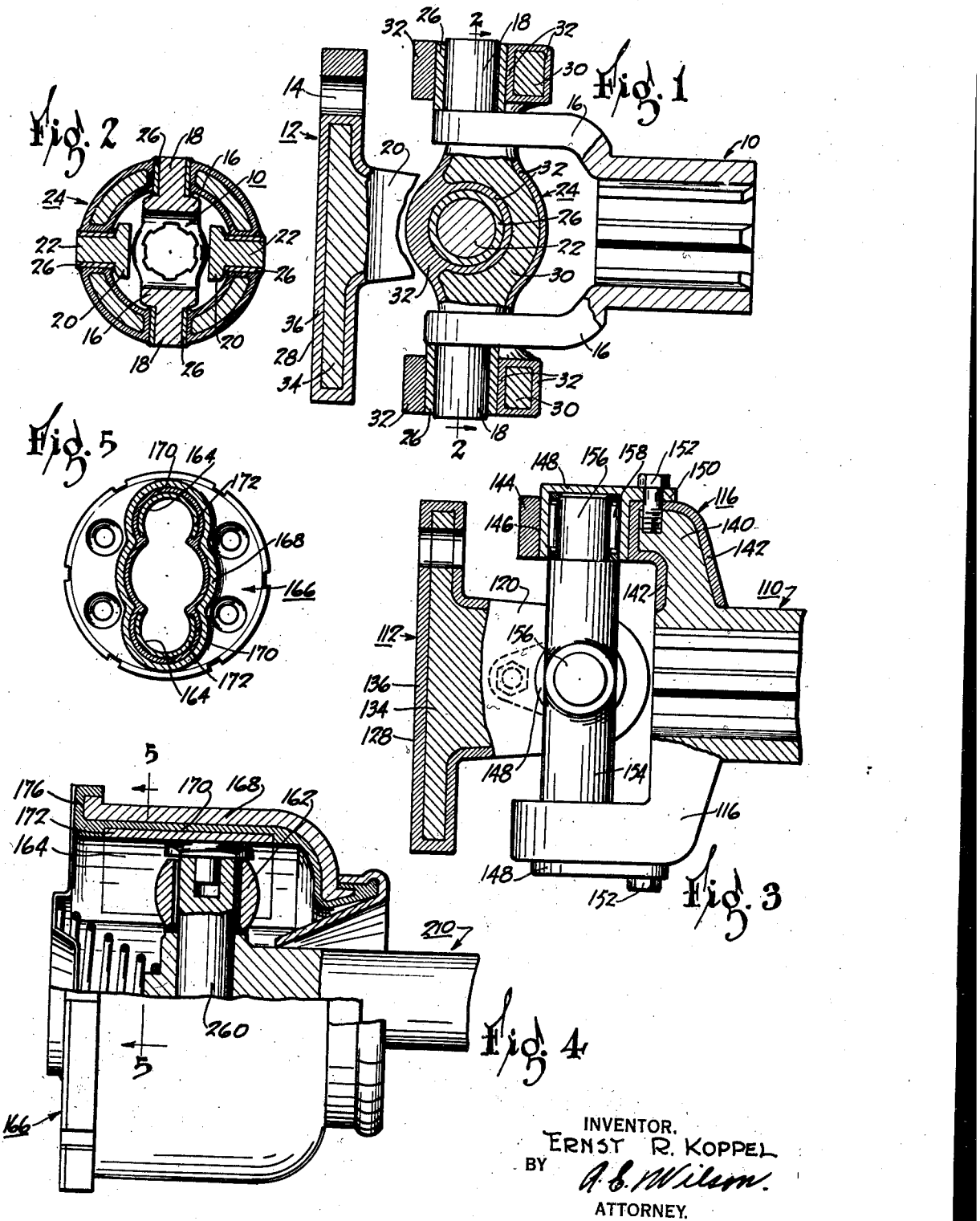
INVENTOR.
ERNST R. KOPPEL
BY
ATTORNEY.

Patented Mar. 26, 1940

2,194,798

UNITED STATES PATENT OFFICE 2,194,798

UNIVERSAL JOINT

Ernst R. Koppel, South Bend, Ind., assignor to Bendix Products Corporation, South Bend, Ind., a corporation of Indiana Application November 9, 1936, Serial No. 109,878

3 Claims. (Cl. 64—8)

This invention relates to universal joints, and more particularly to universal joints which may be formed by a die-casting operation.

It has been found, in the manufacture of universal joints, that the cooperating parts of the joint must be accurately machined, and held to rather close limits to insure satisfactory operation of the joint. The cost of manufacturing a joint is therefore high and this cost is greatly reduced in producing the joint in the novel arrangement disclosed herein where the joint is made in such a manner that some of the more costly machining operations are eliminated without impairing the proper operation of the joint.

An object of this invention is therefore to provide a universal joint which may be manufactured more economically than has been possible heretofore.

A further object of the invention is to provide a die-cast universal joint having reinforcing elements to strengthen the several portions of the joint subjected to high loads.

Another object of the invention is to provide a universal joint of the Cardan type, the elements of which may be formed in part by die-casting operations.

Yet a further object of the invention is to provide a method of die-casting the parts of a Cardan type joint in such a manner as to facilitate the assembly of the joint.

A still further object of the invention is to form a universal joint the parts of which will not require the more expensive machining operations.

Another object is to die-cast a Cardan type universal joint in the fully assembled relation.

Other objects and advantages of this invention will be apparent from the following detailed description, considered in connection with the accompanying drawing, submitted for purposes of illustration only and not intended to define the scope of the invention, reference being had for that purpose to the subjoined claims.

In the drawing, wherein similar reference characters refer to similar parts throughout the several views:

Figure 1 is a view in elevation of a universal joint with several portions broken away and shown in section to more completely disclose the present invention;

Figure 2 is a view taken on the line 2—2 of Figure 1;

Figure 3 is a view similar to Figure 1 showing a different type of universal joint;

Figure 4 is a view similar to Figure 3 showing another type of universal joint; and Figure 5 is a view taken on the line 5—5 of Figure 4.

Referring now more particularly to Figures 1 and 2, there is shown for purposes of illustrating this invention, a universal joint having a splined shank body member 10 adapted to receive a shaft, and a flanged body member 12 having apertures 14 therein adapted to receive bolts or other suitable fastening means to secure the body member 12 to a matching, driving or driven member.

The body members 10 and 12 are provided with spaced arms 16 and 20 respectively adapted to transmit torque from one of the body members to the other. The arms 16 of the splined member 10 have outwardly extending bearing studs 18 on their free ends, likewise arms 20 of the flanged cooperating member 12 have bearing studs 22 on their free extremities. The four bearing studs 18 and 22 are journalled in spaced relation in an annular member 24, having hardened steel bushings 26 which form journals for the bearing studs 18 and 22.

In present forms of universal joints of this type the annular member 24 comprises two similar cooperating elements bolted or otherwise secured together, each of the elements embracing one side of each of the bearing studs. Material expense items are involved in machining these parts so as to aline the joints in assembly as well as preparing the several bearings in producing the annular member; also in the preparation of the flanged member 12 in obtaining the proper dimensions between the bearing studs 22 and the flange face 28.

The annular member 24 of the universal joint of Figure 1 comprises a steel insert or core 30, hardened steel bushings 26, and a layer of die-cast metal 32 surrounding the several parts to maintain them in spaced relation. It will be noted that the steel insert 30 is provided with openings or gaps to permit assembling of the joints and that these gaps are filled in and closed when the die-cast metal is applied.

The member 12 is also disclosed as having a steel insert 34 with arms 20 having a layer of die-cast metal on face 36, which when produced in this manner obviates the necessity of machining the flange face and pilot diameter and bolt holes, all of which must be held to exact dimension.

In producing these joints the bearings 26 are assembled on the bearing studs 18 and 22 and the core 30 is maintained in proper position about the studs of members 10 and 12 the die-cast metal then being flowed relative to the structure to make a complete unit with all of the several bearings and bearing surfaces, that is, the splined shaft receiving end and the flange face, in complete alignment requiring no further machining or assembly operation in order to be placed in regular service.

The joint illustrated in Figure 3 is similar in many respects to the joint shown in Figures 1 and 2, corresponding parts therefore having been given corresponding reference numerals with the addition of 100.

The joint of Figure 1 is assembled and completed with the die-casting operation, while the joint of Figure 3 is die-cast as several separate units and these united into a single unit through the novel arrangement of the several parts permitting rapid and accurate assembly.

While the joint of Figure 1 is described as completed in a single-die-casting operation it may also be made in two casting operations to simplify the die work involved, in which case the flanged member 12 would be first cast and then the assembly and final casting operation would complete the joint.

The splined member 110 has arms 116 formed with steel cores 140 bifurcated at their ends, encased in die-cast metal as shown at 142 and a die-cast metal closure for the bifurcated end as shown at 144. Formed in the die-cast end of the arms 116 is an aperture or bore 146 adapted to receive a hardened steel cup 148 having a bearing race on its inner cylindrical surface. Also formed on the cup 148 is an ear 150 through which it is secured as by a bolt 152 to the arm 116 to prevent its displacement.

The flanged member 112 has arms 120, reinforced with bifurcated steel cores and die-cast ends supporting bearing cups 148 in spaced relation. A steel core 134 which reinforces the arms also is formed with a flange encased in die-cast metal 136 to make unnecessary the machining operations of the flange at 128 and the bores 146. A cruciform member 154 is journalled at the ends 156 in needle bearings 158 retained within the cup members 148.

Assembly of this joint is easily accomplished by positioning the arms 116 and 120 of members 110 and 112 about the cruciform member 154. Needle bearings are positioned about the bearing ends 156 of the member 154 and the cup bearings 148 are inserted into the aperture 146 of the arms 116 and 120 to encase the needle bearings and the ends 156 of the cruciform member. Thereupon bolt 152 secures the cup 148 against displacement and maintains the several parts in spaced relation and against displacement.

While Figures 1 and 3 show joints with one splined member and one flanged member it will readily be seen that both co-operating members may be either splined or flanged as the immediate requisites may demand.

Figures 4 and 5 illustrate still another form of universal joint, in which a member 210 has rotatably mounted in its end a shaft 260 upon the ends of which balls 162, adapted to move in the raceways 164 of a flanged shell member 166, are slidably and rotatably supported. The member 166 is formed of a steel housing 168 within which hardened steel bearing races 172 are maintained in alignment and spaced relation by die-cast metal 170. Die-cast metal 170 also extends over the face of the flange as at 176 to again obviate the machining of the face, outer periphery and bolt holes thereof.

While the invention has been described with particular reference to three desirable embodiments, it is to be understood that many changes may be made in the structural details and in the manner of combining the reinforcing segments with the die-cast sections, and in various methods of heat treating the joint to obtain the desired results without departing from the spirit of the invention as defined by the following claims.

I claim:

1. In a universal joint, adapted to interconnect a pair of shafts, a body member connected to one of the shafts, spaced raceways formed in the body member, a shell surrounding the raceways, a die-cast liner interposed between the raceways and shell to support the raceways and to bind the two rigidly together, and a spindle connected to the other shaft and provided with antifriction means adapted to be received in the raceways.

2. In a universal joint, a torque transmitting member comprising a recessed steel shell, bushings positioned in the recesses of said shell but spaced from the walls thereof, die-cast metal filling the recesses and surrounding the shell to maintain the bushings in fixed position, and a torque-transmitting member having studs rotatably seated in said bushings.

3. In a universal joint body member, a pair of spaced raceways, a shell surrounding the raceways, and a die-cast liner interposed between the raceways and shell to support the raceways.

ERNST R. KOPPEL.

CERTIFICATE OF CORRECTION.

Patent No. 2,194,798. March 26, 1940.

ERNST R. KOPPEL.

It is hereby certified that error appears in the printed specification of the above numbered patent requiring correction as follows: Page 1, second column, line 54, for "about" read --relative to--; line 55, for the words "relative to" read --about--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.